(12) United States Patent
Contreras et al.

(10) Patent No.: US 7,417,209 B2
(45) Date of Patent: Aug. 26, 2008

(54) RECORDING DISK DRIVE WITH REDUCED NOISE THERMAL FLYHEIGHT CONTROL

(75) Inventors: John Contreras, Palo Alto, CA (US); Takashi Ikeda, Kamakura (JP); Yumi Nagano, Fujisawa (JP); Nobumasa Nishiyama, Yokohama (JP); Toyomi Ohsawa, Kawasaki (JP); Mike Suk, Palo Alto, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 309 days.

(21) Appl. No.: 11/361,561

(22) Filed: Feb. 24, 2006

(65) Prior Publication Data
US 2007/0210070 A1  Sep. 13, 2007

(51) Int. Cl.
*H05B 1/02* (2006.01)
(52) U.S. Cl. ............... 219/606; 219/501; 219/491; 219/497
(58) Field of Classification Search ........... 219/491, 219/494, 497, 505, 501, 507
See application file for complete search history.

(56) References Cited

U.S. PATENT DOCUMENTS 6,217,144 B1 * 4/2001 Myung ............... 347/19

| 2004/0114268 A1 | 6/2004 | Satoh et al. ............. 360/75 |
| 2004/0240109 A1 * | 12/2004 | Hamann et al. ........ 360/126 |
| 2005/0213250 A1 | 9/2005 | Kurita et al. .......... 360/234.4 |
| 2006/0245100 A1 * | 11/2006 | Satoh et al. ............. 360/1 |
| 2007/0035881 A1 * | 2/2007 | Burbank et al. ....... 360/234.3 |

FOREIGN PATENT DOCUMENTS

| JP | 2004192742 A | 12/2002 |
| JP | 2004-192742 A | 7/2004 |
| JP | 2005-276284 A | 10/2005 |
| JP | 2005276284 A | 10/2005 |

* cited by examiner

*Primary Examiner*—Mark H Paschall
(74) *Attorney, Agent, or Firm*—Bracewell & Giuliani LLP (57) ABSTRACT

A system and method for preventing crosstalk noise from being superimposed on a read signal due to noise from a heater line for a slider in a recording disk drive is disclosed. A heater line pair to the slider is not grounded but is in a floating state with respect to an actuator support structure. A heater driver allows a heater current to flow between a positive power supply voltage and a negative power supply voltage. The heater line pair is not grounded, so an impedance is high as viewed from a magnetic disk. Thus, it is possible to effectively suppress a noise transmitted from the magnetic disk and read signal quality is kept from deteriorating due to the crosstalk from the heater line.

9 Claims, 10 Drawing Sheets

RECORDING DISK DRIVE WITH REDUCED NOISE THERMAL FLYHEIGHT CONTROL

BACKGROUND OF THE INVENTION

1. Field of the Invention

The present invention relates to a recording disk drive. In particular, the invention relates to a recording disk drive equipped with a heater for adjusting a clearance between a head and a recording disk at a head slider.

2. Description of Related Art

Currently, data recording apparatuses using various media such as an optical disk, magnetic tape, and a semiconductor memory have been known in the art. In particular, a hard disk drive (HDD) has been widely used as a storage device of a computer. The HDD is an indispensable storage device for current computer systems. The HDD has found widespread application such as a removable memory used in a moving image recording/reproducing apparatus, a car navigation system, a cell phone, or a digital camera, in addition to the computer, due to its outstanding characteristics.

A magnetic disk used for the HDD has plural concentric data tracks, each of which records plural servo data including address information and plural data sectors. Plural data sectors are recorded between the respective servo data. A head element portion of a head slider supported to an oscillating actuator accesses a desired data sector based on address information of the servo data, making it possible to write/read data to/from the data sector.

In order to improve a recording density of the magnetic disk, it is important to reduce the clearance between the head element portion flying over the magnetic disk and the magnetic disk. To that end, some mechanisms for adjusting the clearance have been proposed. One of them includes a heater for a head slider to heat a head element portion with the heater to adjust a clearance (see Japanese Unexamined Patent Application Publication No. 2004-192742). In this specification, this mechanism is referred to as "TFC" (Thermal Flyheight Control). According to the TFC, current is supplied to the heater to generate heat, and protrude the head element portion through thermal expansion. Hence, the clearance between the magnetic disk and the head element portion can be reduced.

If the head slider includes the heater for the TFC, it is important to suppress noise on a heater line pair for supplying a heater current and crosstalk noise on a read signal resulting from the noise. The heater line pair has been known to be susceptible to a noise from a preamplifier.

However, crosstalk noise on the read signal results from not only the noise from the preamplifier but noise transmitted from the magnetic disk to the heater line pair. In addition, it has been found that the noise from the magnetic disk is more likely to incur the crosstalk noise on the read signal than the noise from the preamplifier, in some HDDs.

Figure 10:
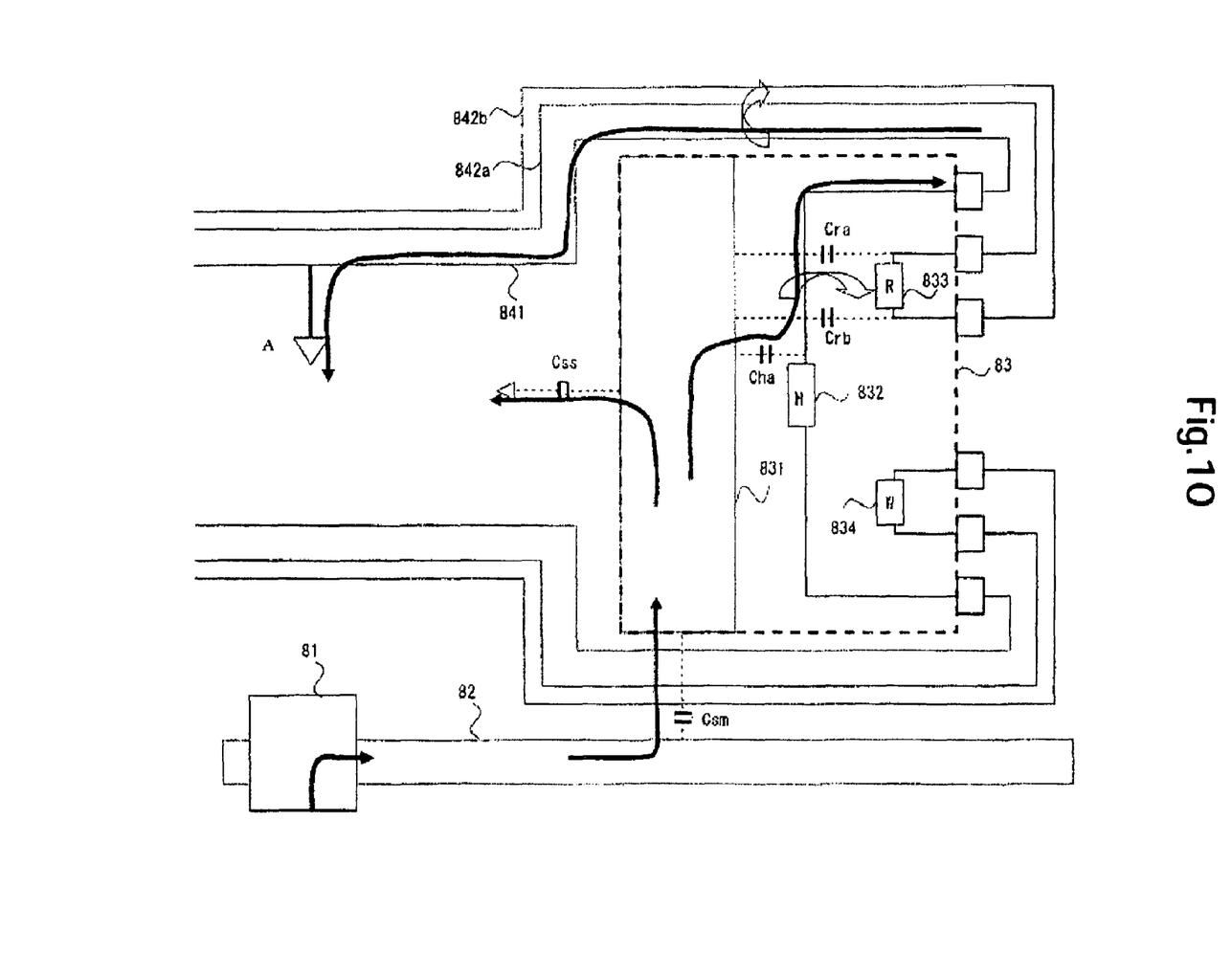
FIG. 10 shows how noise is transmitted from a magnetic disk to a heater line pair to cause a crosstalk that leads to noise superimposed on a read signal in the prior art.

FIG. 10 shows how a crosstalk noise is superimposed on the read signal due to noise transmitted from the magnetic disk into the heater line pair. In FIG. 10, a head slider 83 includes a heater 832, a read element 833, and a write element 834, which are formed on a slider 831 and insulated from one another by an insulator. The configuration of the elements in FIG. 10 is just for illustrative purpose only and the actual configuration may be different.

Noise generated from a servo-controller spindle motor 81 is transmitted to the slider 831 of the head slider 83 via a capacitance component Csm. The noise is transmitted to a suspension via a capacitance component Css and also into a heater line 841 grounded to the suspension via a capacitance component Cha.

The noise is superimposed on the read signal via capacitance components Cra and Crb in the head slider 83. Further, crosstalk occurs between read lines 842a and 842b for supplying a heater current to lower the S/N ratio of the read signal.

SUMMARY OF THE INVENTION

The present invention has been accomplished in view of the aforementioned circumstances, and it is accordingly an object of the invention to provide a recording disk drive that protrudes a head using a heater to adjust a clearance from a recording medium, which suppresses transmission of noise to a heater line and suppresses crosstalk noise on a read signal resulting from the noise.

A recording disk drive according to an embodiment of the present invention includes: a head slider with a slider flying over a rotating recording disk; a head element portion on the slider; and a heater on the slider for adjusting a clearance between the head element portion and the recording disk; an actuator holding the head slider and moving the head slider; and a heater line pair connected with the head slider and electrically floating from the actuator to supply a current to the heater. The heater line pair is electrically floating from the actuator, making it possible to suppress a noise externally transmitted to the heater line pair.

Preferably, one line of the heater line pair has a positive potential and the other line of the heater line pair has a negative potential when the current is supplied to the heater. Hence, it is possible to more reliably suppress a noise transmitted from the recording disk to the heater line pair. Further, preferably, an absolute value of the positive potential is the same as an absolute value of the negative potential. Hence, it is possible to set the heater potential closer to 0 to lower DC potential supplied from the heater to the head element portion and effectively prevent the head element portion from being damaged due to a discharge between the recording disk and the head element portion.

Preferably, the recording disk drive further includes a circuit for driving the heater, which is electrically connected with the heater line pair, and in the circuit, one line of the heater line pair is grounded. Hence, it is possible to suppress a noise transmitted into the heater line pair and simplify a circuit configuration.

Preferably, the head element portion includes a write element and a read element, the recording disk drive further includes: a write line pair connected with the head slider and transmitting a signal of the write element; and a read line pair connected with the head slider and transmitting a signal of the read element, and the heater line pair extends between the write line pair and the read line pair. Hence, it is possible to suppress a crosstalk of the write line pair with the read line pair.

Preferably, a characteristic impedance of the heater line pair is higher than characteristic impedance of the write line pair. Hence, it is possible to more effectively suppress a noise transmitted to the heater line. The recording disk drive further includes a circuit electrically connected with the heater line pair for driving the heater, and if one line of the heater line pair is grounded in the circuit, the line on the write line pair side is grounded. It is therefore possible to suppress a crosstalk of the heater line with the read line. Alternatively, a characteristic impedance of the heater line pair is higher than a characteristic impedance of the write line pair by 20 Ω or more.

A recording disk drive according to another aspect of the invention includes: a head slider having a slider flying over a rotating recording disk; a head element portion provided to the slider and including a read element and a write element; and a heater provided to the slider and adjusting a clearance between the head element portion and the recording disk; a read line pair connected with the head slider and transmitting a signal of the read element; a write line pair connected with the head slider and transmitting a signal of the write element; and a heater line pair connected with the head slider for supplying a current to the heater, extending between the write line pair and the read line pair, and having a characteristic impedance higher than a characteristic impedance of the write line pair. The characteristic impedance of the heater line pair is set high, making it possible to suppress a noise externally transmitted to the heater line pair.

Preferably, one line of the heater line pair has a positive potential and the other line of the heater line pair has a negative potential when the current is supplied to the heater. Further, an absolute value of the positive potential is the same as an absolute value of the negative potential.

Preferably, the recording disk drive further includes: a circuit for driving the heater, which is electrically connected with the heater line pair; and an actuator holding the head slider and moving the head slider, and the heater line pair is electrically floating from the actuator, and one line of the heater line pair on the write line pair side is grounded in the circuit.

According to the recording disk drive of the present invention, in which a head element portion is made to protrude using a heater to adjust a clearance from a recording medium, the noise transmitted to the heater line is suppressed to reduce crosstalk noise on a read signal due to the noise.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other objects, advantages and features of the present invention will be more apparent from the following description taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated.

One main feature of this embodiment is TFC (Thermal Flyheight Control). According to TFC, clearance between a head element portion and a recording disk is adjusted by utilizing heat from a heater on a slider to improve reproducing/recording characteristics of the head element portion. In particular, this embodiment has the circuit configuration for suppressing noise from a recording disk to a heater line for supplying current to a heater for the TFC. Suppressing noise on the heater line results in reduction in crosstalk noise on a read signal. In the following description, the embodiment of the present invention is explained with a hard disk drive (HDD) as an example of a recording disk drive. To facilitate the understanding of a feature of this embodiment, the entire configuration of the HDD is first outlined.

Figure 1:
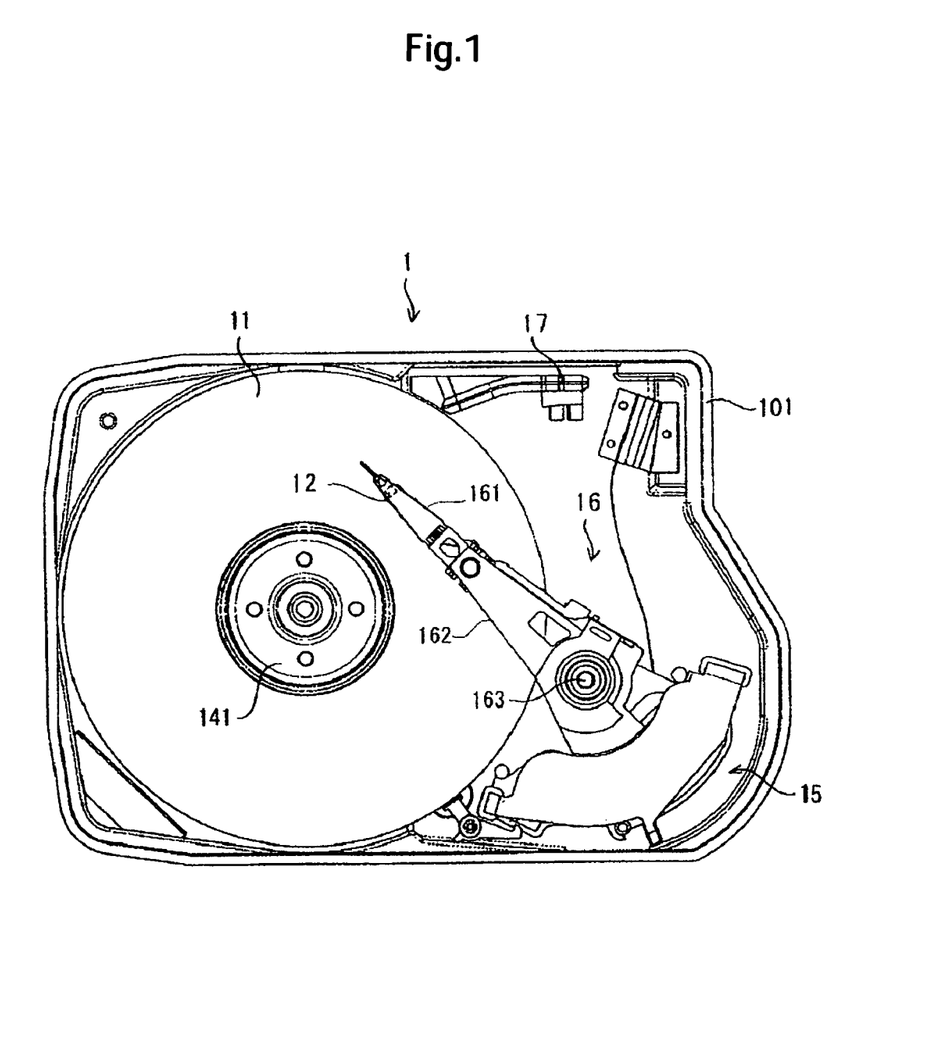
FIG. 1 is a schematic diagram showing the entire structure of a hard disk drive according to an embodiment of the present invention.

FIG. 1 shows the schematic configuration of an HDD 1 according to the embodiment of the present invention. In the HDD 1 illustrated in FIG. 1, an actuator 16 is in operation. In FIG. 1, reference numeral 11 denotes a recording disk for recording data. The recording disk 11 is a nonvolatile recording disk such as a magnetic disk with a magnetic layer for recording data. A base 101 is fixed to a top cover (not shown) for covering an upper opening of the base 101 via a gasket (not shown) to complete an enclosure that encapsulates components of the HDD 1.

The magnetic disk 11 is fixed to a spindle motor (SPM) (not shown) by means of a clamp 141. The SPM rotates the magnetic disk 11 at a predetermined speed. A head slider 12 accesses a recording area of the magnetic disk 11. The head slider 12 includes a head element portion and a slider fixed to the head element portion. The head slider 12 of this embodiment particularly includes a heater for heating and protruding the head element portion to adjust a clearance (flyheight) from the magnetic disk 11 for the TFC. The configuration of the head slider 12 is described later with reference to FIG. 2.

The actuator 16 moves the head slider 12. In FIG. 1, the actuator is pivotally held to a pivot shaft 163. The actuator pivots on the pivot shaft 163 in a radius direction of the magnetic disk 11 by means of a torque from a VCM (voice coil motor) 15 as a driving mechanism to move the head slider 12 to a desired position. The actuator 16 includes plural pairs of suspensions 161 and arms 162 which are stacked, and the head slider 12 is fixed to the tip end of each suspension 161. An assembly of each suspension 161 and the head slider 12 is called a "head gimbal assembly (HGA)".

A viscosity resistance of the air between the rotating magnetic disk 11 and an ABS (Air Bearing Surface) of the slider 12 opposing the magnetic disk 11 is balanced with a force applied by the actuator 16 toward the magnetic disk 11, whereby the head slider 12 floats or flies over the magnetic disk 11. Further, the HDD 1 of this embodiment is a load/unload type, and includes a ramp 17 that is provided close to the outer edge of the magnetic disk 11. The HDD 1 retracts the head slider 12 from the magnetic disk 11 to the ramp 17 when the magnetic disk 11 is stopped or for the purpose of saving power.

Figure 2:
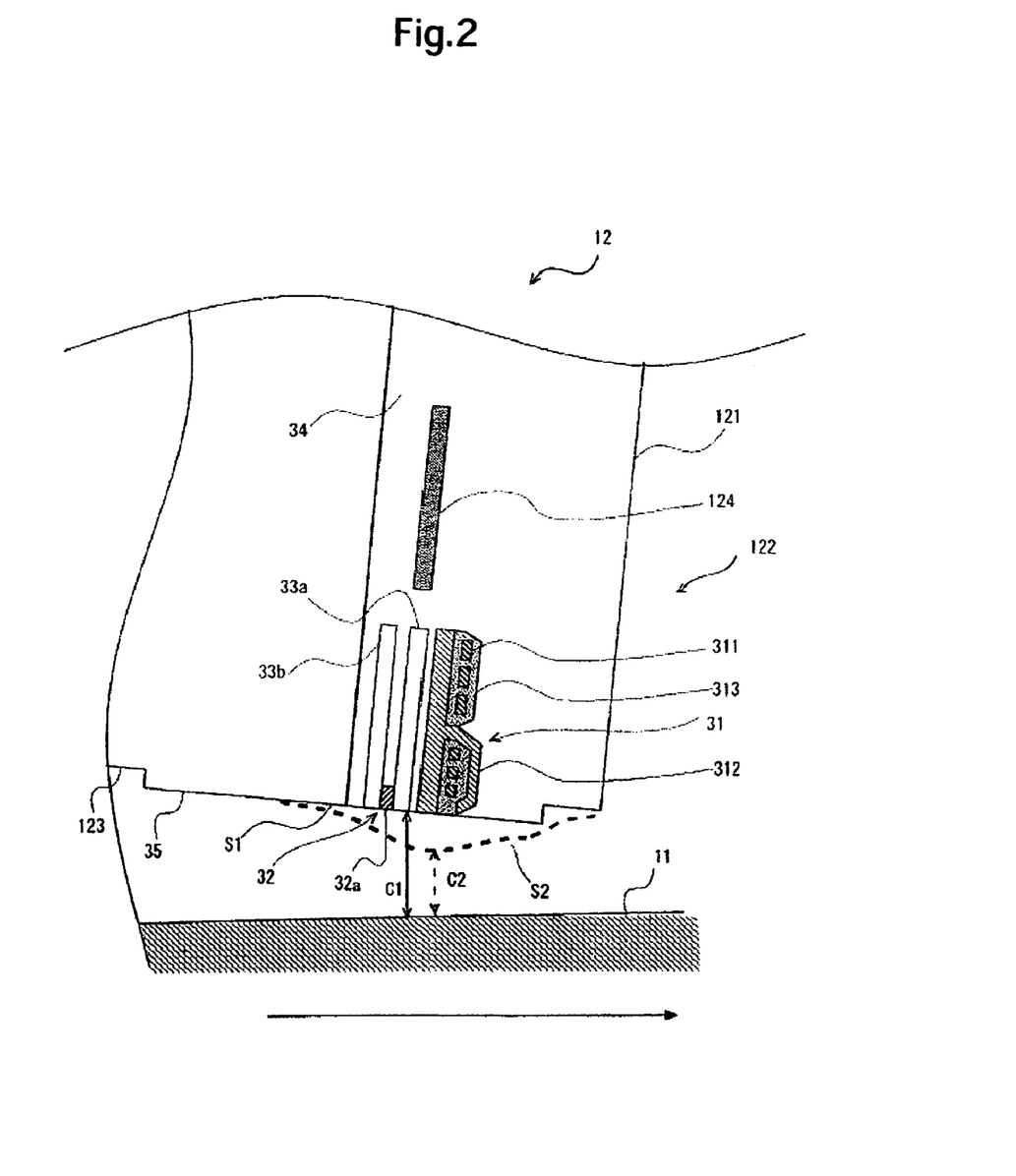
FIG. 2 is a sectional view schematically showing the structure of a head slider including a heater for TFC according to an embodiment of the present invention.

Next, the configuration of the TFC head slider 12 of this embodiment is described. FIG. 2 is a sectional view showing a part of the head slider configuration around an air flow-out end surface (trailing-edge-side end surface) 121 of the head slider 12. The magnetic disk 11 rotates in the direction of the arrow from left to right in FIG. 2. The head slider 12 includes a head element portion 122 and a slider 123 supporting the head element portion 122. Incidentally, the TFT of this embodiment is applicable to both vertical magnetic recording and horizontal magnetic recording for an HDD.

The head element portion 122 reads/writes magnetic data from/to the magnetic disk 11. The head element portion 122 includes a read element 32, and a write element 31 provided on the trailing edge of the read element. The write element 31 is an inductive element where a magnetic field is generated between magnetic poles 312 with a current flowing through the write coil 311 to record magnetic data on the magnetic disk 11. The read element 32 is a magnetoresistive type element, which includes a magnetoresistive element 32a of a magnetic anisotropy for reading magnetic data recorded on the magnetic disk 11 based on a resistance value thereof that varies depending on the intensity of a magnetic field applied from the magnetic disk 11.

The head element portion 122 is formed on an AlTiC substrate that forms the slider 123 through a thin-film formation process such as plating, sputtering, or polishing. The magnetoresistive element 32a is interposed between magnetic shields 33a, 33b, and the write coil 311 is covered with an insulating film 313. Further, the head element portion 122 includes a protective film 34 made of alumina or the like around the write element 31 and the read element 32 to protect the entire head element portion 122. A heater 124 is formed using a thin-film resistor with a thin-film formation process around the write element 31 and the read element 32. In this example, the heater 124 is provided on the side of the head element portion 122 opposite to the magnetic disk 11. Alternatively, the heater 124 may be formed by using a thin-film resistor in a serpentine form using permalloy and filling a gap with alumina.

If a preamplifier 42 supplies current to the heater 124, the head element portion 122 deforms and protrudes from the heat of heater 124. When not heated, the ABS of the head slider 12 has a shape as indicated by S1 of FIG. 2 with a clearance between the head element portion 122 and the magnetic disk as indicated by C1. A protruded form S2 indicated by the broken line of FIG. 2 is obtained by heating the heater 124. At this time, the head element portion 122 approaches the magnetic disk 11 with a clearance C2 smaller than the clearance C1. Incidentally, FIG. 2 is a conceptual view, and the dimensions of each component of FIG. 2 are not necessarily precise. For example, the protruded form S2 has a protrusion amount on the order of nanometers (several nanometers).

Figure 3:
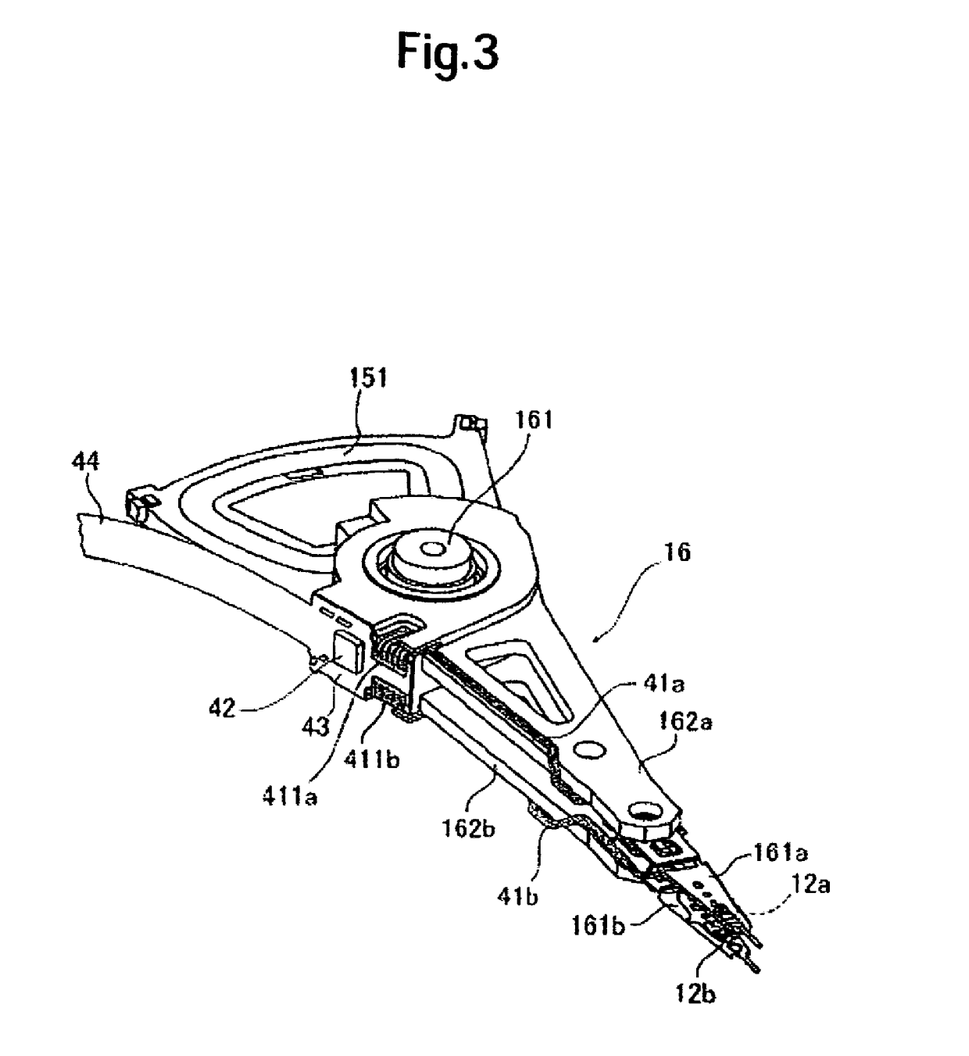
FIG. 3 is a perspective view schematically showing the structure of a head stack assembly according to an embodiment of the present invention.
Figure 4:
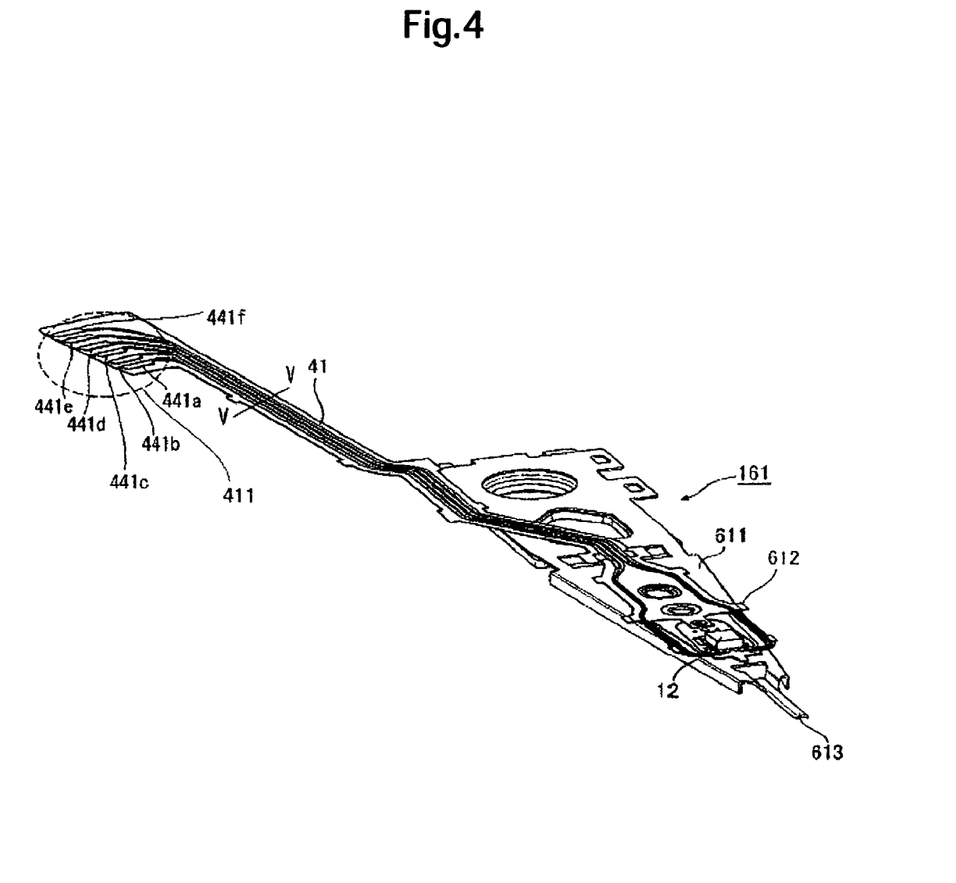
FIG. 4 is a perspective view schematically showing the structure of a head gimbal assembly according to an embodiment of the present invention.

FIG. 3 a schematic perspective view showing the structure of a head stack assembly (HSA) as an assembly of the actuator 16 and the head slider 12. FIG. 4 is a schematic perspective view showing the structure of the HGA. In the illustrated example of FIG. 3, the actuator 16 includes two suspensions 161a, 161b, and arms 162a, 162b. Head sliders 12a, 12b are fixed to the suspensions 161a, 161b. A VCM coil 151 as a part of a VCM 15 is provided opposite to the suspensions 161a, 161b with respect to the pivot shaft 163.

The header sliders 12a, 12b are connected with traces 41a, 41b including plural transmission lines. The traces 41a, 41b transmit signals of the write element 31 and the read element 32, and supply a heater current to the heater 124. For that purpose, the traces 41a, 41b each include six transmission lines composed of a write line pair, a read line pair, and a heater line pair.

The traces 41a, 41b include multi-connectors 411a, 411b on the side opposite to the head sliders 12a, 12b. The multi-connectors 411a, 411b are connected with a circuit substrate 43. The traces 41a, 41b extend from the head sliders 12a, 12b to the circuit substrate 43 along the suspensions 161a, 161b and the arms 162a, 162b. The heater line pair of each trace of this embodiment is not grounded to the actuator 16 for preventing noise from the magnetic disk 11 but is in a floating state. This is described later in more detail.

A preamplifier 42 is mounted to the circuit substrate 43. The preamplifier 42 includes a heater driver for driving the heater 124 as well as a write driver for driving the write element 31, and a read driver and receiver for driving the read element 32. An FPC (Flexible Printed Circuit) 44 is connected with the circuit substrate 43 for transmitting a signal between a control circuit (not shown) of the HDD 1 and the preamplifier 42. Incidentally, the preamplifier 42 is preferably secured in a position closer to the head slider 12 on the actuator 16 from the viewpoint of amplifying a signal but may be provided ahead of the FPC 44 extending from the circuit substrate 43.

As shown in FIG. 4, the suspensions 161 include an elastic load beam 611 and flexible gimbals 612. The head slider 12 is secured to a film on the gimbal 612. The load beam 611 includes a tab 613 at its end, and the tab 613 is caught on the ramp 17.

On the trailing edge side of the head slider 12 (actuator tip end side), the traces 41 are connected with the head slider 12. Further, a part of the traces 41 are fixed onto the suspensions 161. Six contacts (not shown) corresponding to the transmission lines are formed on the trailing edge side of the head slider 12. Each contact is connected with the transmission line of each trace 41. The multi-connectors 411 include six contacts 441a to 441f. Among those, the contacts 441a and 441b, the contacts 441c and 441d, and the contacts 441e and 441f are used for the write element 31, for the heater 124, and for the read element 32, respectively.

Figure 5:
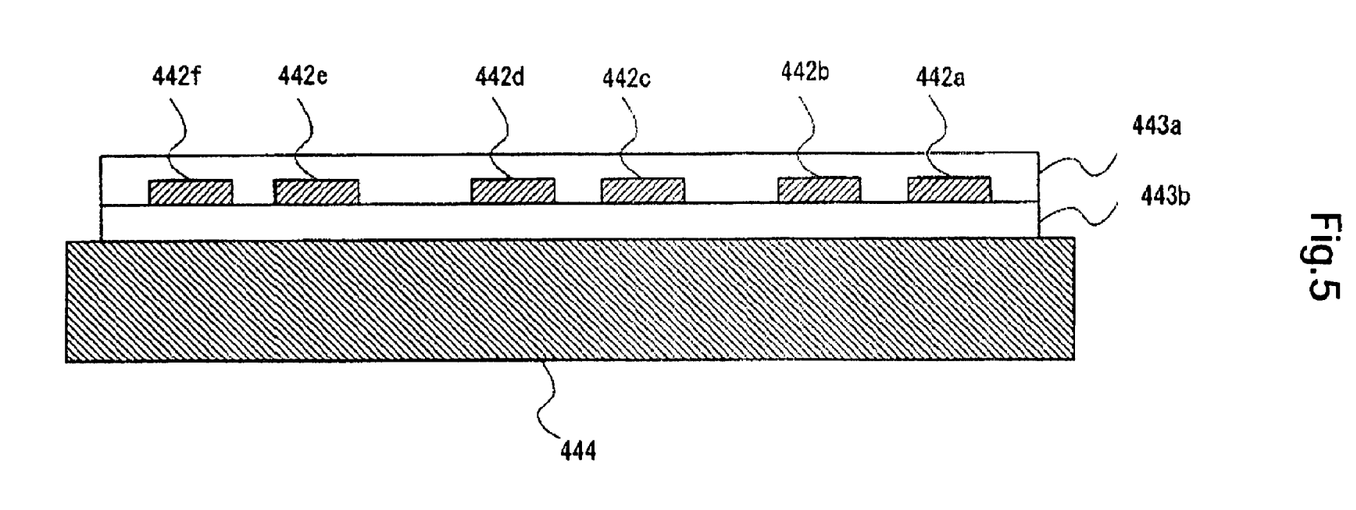
FIG. 5 is a schematic sectional view of a trace taken along the line V-V of FIG. 4.

FIG. 5 is a schematic sectional view of the traces 41 taken along the line V-V of FIG. 4. The traces 41 include a write line pair 442a, 442b for transmitting a signal of the write element 31, a heater line pair 442c and 442d for supplying a current to the heater 124, and a read line pair 442e and 442f for transmitting a signal of the read element 32. The lines 442a to 442f are insulated from one another by polyimide layers 443a, 443b as insulators. The lines themselves may be formed of, for example, copper.

The write line pair 442a, 442b transmits high frequency signals for writing data to the magnetic disk 11. Therefore, the rapid change of the electromagnetic field occurs around the write line pair 442a, 442b. On the other hand, the heater line pair 442c, 442d transmits DC current where the current value changes slowly depending on a temperature change and so on. In this embodiment, the heater line pair 442c, 442d extends between the write line pair 442a, 442b and the read line pair 442e, 442f. Thus, heater line pair 442c, 442d acts as a wall against noise from the write line pair 442a, 442b, thereby reducing crosstalk noise from the write line pair 442a, 442b to the read line pair 442e, 442f.

The traces 41 further include a back side metal layer 444. The back side metal layer 444 is formed integrally with the gimbals 612. This layer extends from the gimbals 612. The gimbals 612 and the back side metal layer 444 can be formed of, for example, stainless steel.

The polyimide layer 443b is interposed between the back side metal layer 443 and each of the lines 442a to 442f to form a microstrip construction. The back side metal layer 444 suppresses crosstalk that would occur among the lines 442a to 442f. For suppressing crosstalk, it is desirable to further form a metal layer on the side opposite to the back side metal layer 444. Here, the circuit of this embodiment is applicable to traces not having the back side metal layer 44. The traces 41 may include more lines than the six lines.

Figure 6:
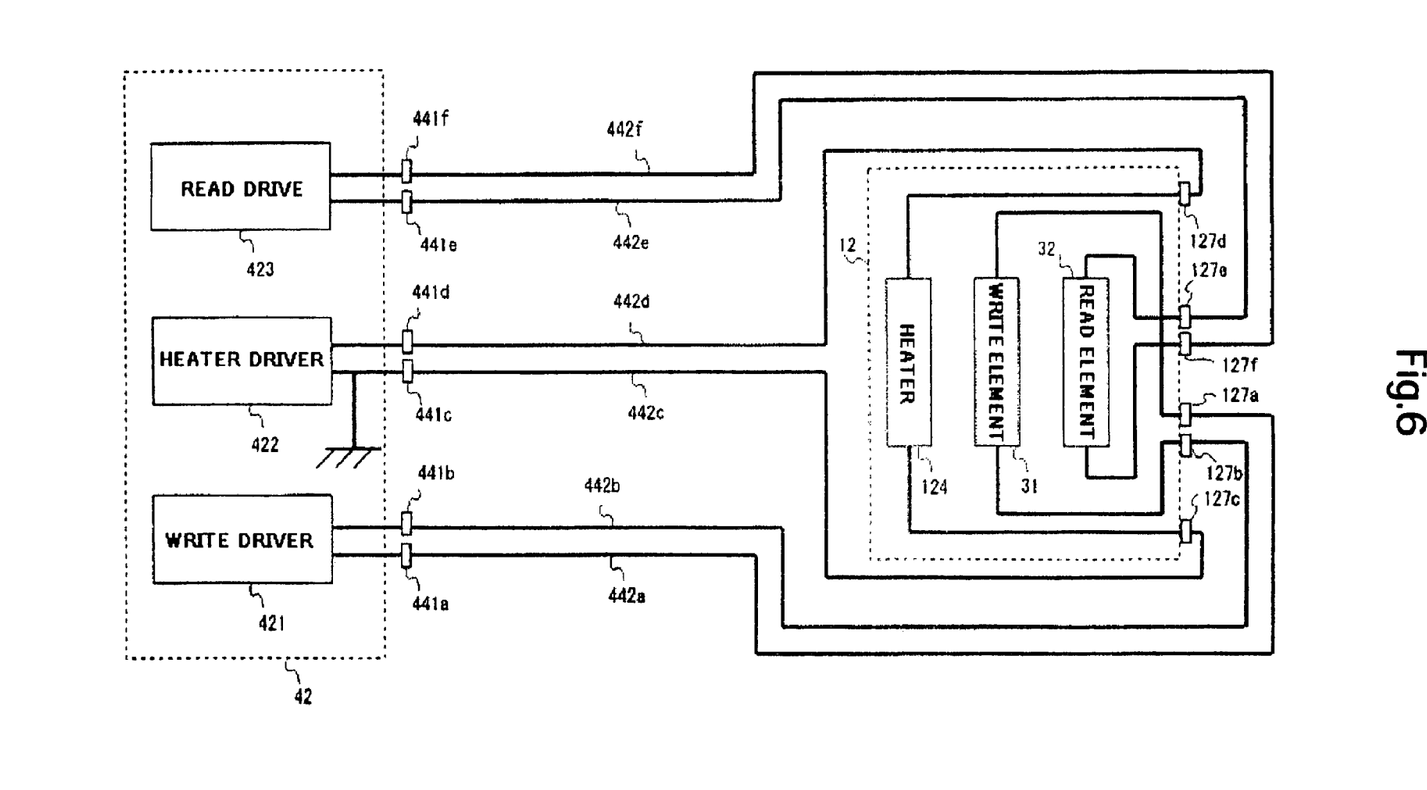
FIG. 6 shows a preferred configuration example of a circuit from a preamplifier to a head slider according to an embodiment of the present invention.

FIG. 6 is a circuit block diagram schematically showing a preferred configuration example of a circuit from the preamplifier 42 to the head slider 12. The preamplifier 42 includes a write driver 421 for driving the write element 31, a heater driver 422 for driving the heater 124, and a read driver and receiver 423 for driving the read element 32. The lines 442a to 442f of the traces 41 are connected with contacts 127a to 127f of the head slider 12, respectively.

The heater line pair 442c, 442d is in a floating state between the contacts 127c, 127d and the contacts 441c, 441d on the preamplifier 42 side. In other words, the heater line pair 442c, 442d is not grounded to the actuator 16. As a result, noise transmission from the magnetic disk 11 to the heater line pair 442c, 442d can be suppressed to reduce a crosstalk noise on a signal of the read element 32.

Figure 7:
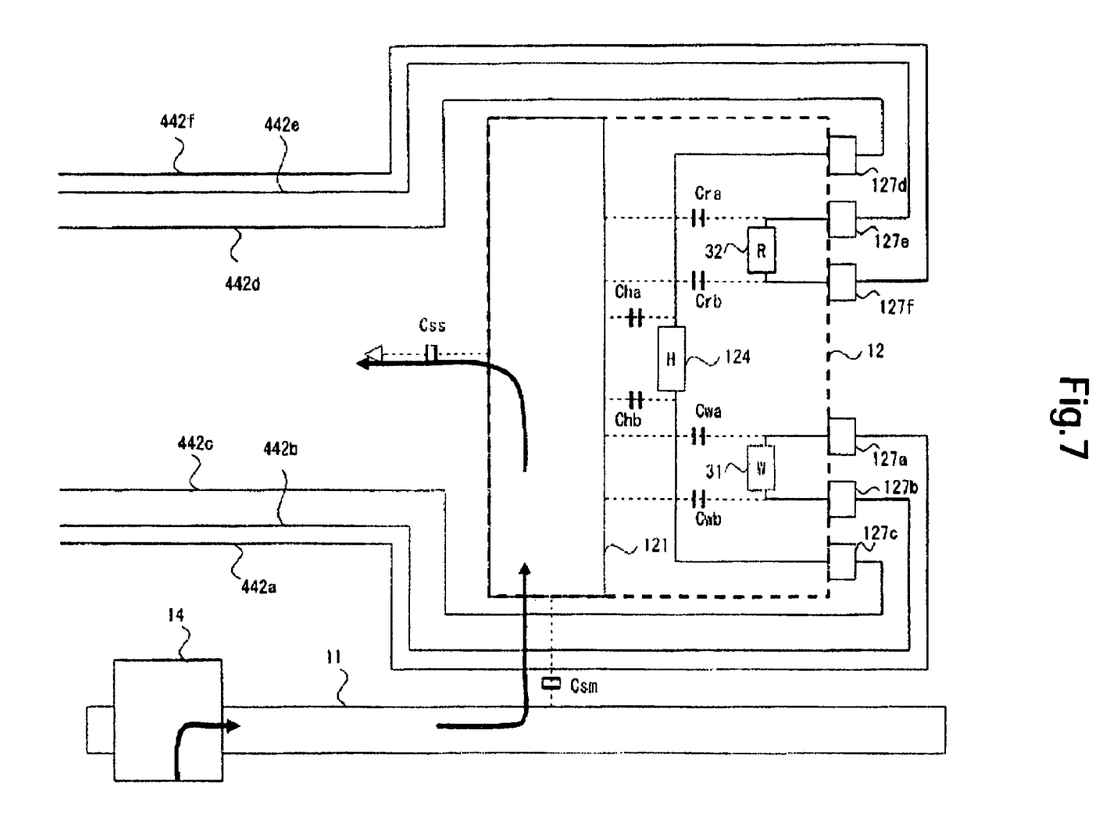
FIG. 7 shows how to prevent a noise from being superimposed on a read signal due to a crosstalk while blocking a noise transmitted from a magnetic disk to a heater line pair.

If noise current from the magnetic disk 11 flows through the heater line pair 442c, 442d, crosstalk to the heater line pair 442c, 442d occurs leading to noise on the signal of the read element 32 and the read line pair 442e, 442f. As in this example, if the heater line pair 442c, 442d floats on the actuator 116, as shown in FIG. 7, noise from the magnetic disk 11 is transmitted from the slider 121 to the suspensions 161 via a capacitance component Css. This is because an impedance of the heater line pair 442c, 442d is high as viewed from the magnetic disk 11 side, so the noise from the magnetic disk 11 is transmitted toward the lower impedance lines, namely the noise flows from the slider 12 toward the suspension 161 via Css.

The servo-controlled spindle motor 14 generates noise that is transmitted from the magnetic disk 11 to the slider 121 via a capacitance component Csm of the air. If one of the heater lines 442c, 442d is grounded to the actuator 16 (particularly, the suspensions 161), the noise transmitted through the slider 121 also flows into the heater line pair 442c, 442d via a capacitance component Cha or Chb.

As a result, noise resulting from crosstalk that occurs via the capacitance component Cra or Crb, or noise resulting from a crosstalk between the heater line pair 442c, 442d and the read line pair 442e, 442f leads to noise on the read signal. As in this example, the heater line pair 442c, 442d is made electrically floating to thereby increase an impedance of the heater line pair as viewed from the magnetic disk 11, by which the noise flowing into the heater line pair 442c, 442d, which could cause crosstalk noise to the read signal, is suppressed.

In the preamplifier 42, one output terminal of the heater driver 421 is grounded. That is, one of the heater lines 442c, 442d is grounded in the preamplifier 42. To simplify a power supply circuit, it is preferable to ground one power supply line of the preamplifier 42. In this case, one of the heater lines needs to be grounded in the preamplifier 42. However, because of a considerable line length between the head slider 12 and the preamplifier 42, it is possible to reduce noise transmitted from the magnetic disk 11 to the heater line pair 442c, 442d to prevent a high-level noise on a read signal.

It is preferable that the heater line 442c on the write element 31 side be grounded in the preamplifier 42. The line grounded in the preamplifier 42 is more susceptible to noise than the remaining ungrounded line. To that end, the heater line 442c arranged on the write line pair 442a, 442b side is grounded to cause noise to flow through the heater line 442d on the read element 32 side and suppress crosstalk noise on the read signal. This configuration is effective particularly when the characteristic impedance of the heater line pair 442c, 442d is close to the write line pair 442a, 442b.

Incidentally, there is a possibility that crosstalk noise that occurs via a capacitance component Cwa or Cwb, or noise that occurs due to a crosstalk between the heater line pair 442c, 442d and the write line pair 442a, 442b is superimposed on a write signal, but the noise on the write signal is negligible unlike the noise on the read signal.

As mentioned above, the heater line pair 442c, 442d is provided between the write line pair 442a, 442b and the read line pair 442e, 442f, making is possible to suppress crosstalk between the write line pair 442a, 442b and the read line pair 442e, 442f. The heater line pair 442c, 442d is electrically floating from the head slider 12 to the preamplifier 42, thus preventing the noise from flowing into the heater line pair 442c, 442d even if one line of the heater line pair 442c, 442d is grounded in the preamplifier 42. Further, the heater line 442c near the write line pair 442a, 442b is grounded in the preamplifier 42, and thus even if one power supply line of the heater driver 412 is grounded, crosstalk noise on the read signal can be effectively suppressed.

As mentioned above, in order to suppress the noise transmitted to the heater line pair 442c, 442d, it is preferable to increase an impedance of the heater line pair. Characteristic impedances of the write line pair 442a, 442b and the read line pair 442a, 442f need to be set as an appropriate design value from the viewpoint of easy signal transmission. On the other hand, the heater line pair 442c, 442d supplies DC current to the heater 124 and has little characteristic impedance dependence, therefore the characteristic impedance can be set higher than other line pairs for noise reduction.

Based on the above, it is preferred to set a characteristic impedance of the heater line pair 442c, 442d higher than those of the write line pair 442a, 442b. Further, it is preferable to set the characteristic impedance of the heater line pair 442c, 442d higher than that of the write line pair 442a, 442d by 20 Ω or more, more preferably, 30 Ω or more. For example, the characteristic impedances of the write line pair 442a, 442b is set to 60 to 70 Ω, and the characteristic impedance of the heater line pair 442c, 442d is set higher than the above values by 20 Ω or more. Setting the characteristic impedances in this way makes it possible to suppress a noise transmitted from the magnetic disk 11 to the heater line pair 442c, 442d.

Based on the above, it is further preferred to set the characteristic impedance of the heater line pair 442c, 442d higher than those of the read line pair 442e, 442f. The impedance difference is preferably no less than 20 or 30 Ω, as the write line pair 442a, 442d. When a TMR head is used for the read element, the characteristic impedance should be higher than a GMR head. However, the maximum impedance of a trace line pair is limited and it is preferred that the characteristic impedance of the heater line pair 442c, 442d is higher than those of the read line pair 442e, 442f in this limitation.

When the characteristic impedance of the heater line pair 442c, 442d is set higher as mentioned above, the heater line pair 442c, 442d can be grounded to the actuator 11 by the HDD 1. However, in order to suppress the noise transmitted into the heater line pair 442c, 442d with higher reliability, the characteristic impedance thereof is set higher and preferably, the heater line pair 442c, 442d floats over the suspensions 161 or the actuator 16.

Incidentally, the characteristic impedance of each trace varies around the head slider 12, but the characteristic impedance of the main portion is designed to be constant. This constant value is the above characteristic impedances. More specifically, the characteristic impedances of tail portions extending along the arms 162 are the characteristic impedances of each line pair.

Figure 8:
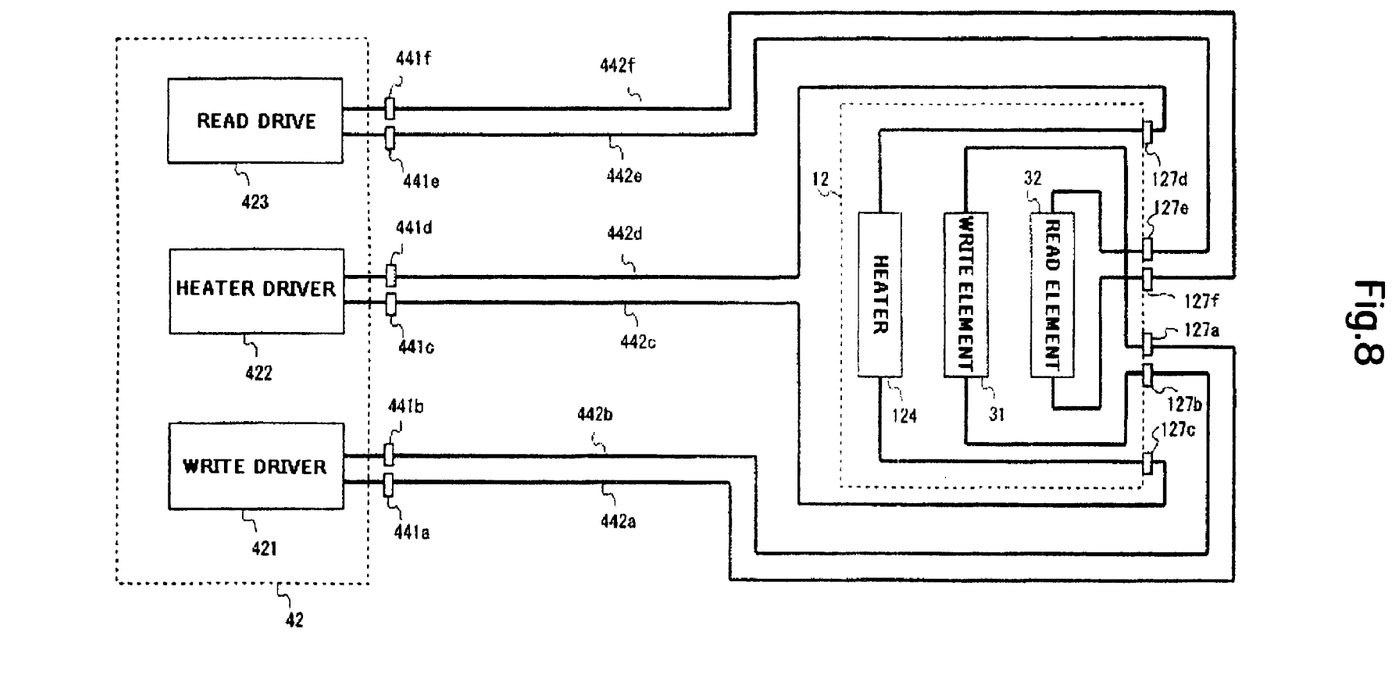
FIG. 8 shows another preferred configuration example of the circuit from the preamplifier to the head slider according to an embodiment of the present invention.
Figure 9:
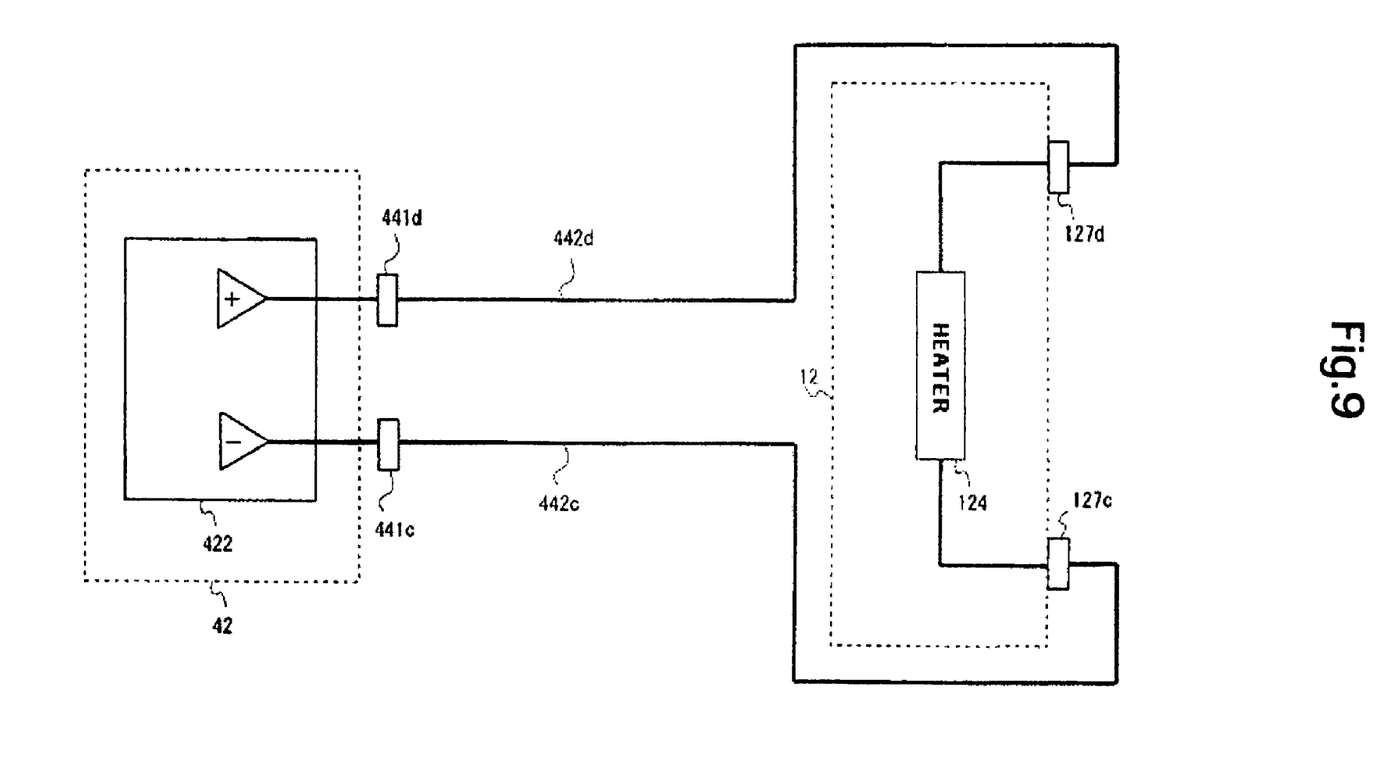
FIG. 9 schematically shows the configuration of a heater driver in the circuit configuration of FIG. 8 according to an embodiment of the present invention.

Referring to FIGS. 8 and 9, another preferred configuration example of the circuit from the preamplifier 42 to the head slider 12 is described. As shown in FIG. 8, the heater line pair 442c, 442d of this example is not grounded in the preamplifier 42. As shown in FIG. 9, the heater driver 422 allows a heater current to flow between its positive power supply voltage and negative power supply voltage. Since the heater line pair 442c, 442d is not grounded, the impedance is high as viewed from the magnetic disk 11, making it possible to more effectively suppress noise transmission.

Preferably, an absolute value of a positive power supply potential is the same as that of a negative power supply potential. When power is supplied to the heater 124, an induced potential is generated from the heater 124 to the read element 32 or the write element 31. This induced potential varies depending on a central potential of the heater 124. The higher induced potential causes discharge between the head element portion 122 and the magnetic disk 11 to damage the head element portion 122. In particular, the read element 32 is easily damaged by a high potential, so an absolute value of the central potential of the heater 124 is set not to incur the discharge.

Accordingly, it is preferable that an absolute value difference between the negative power supply potential and the positive power supply potential is less than twice as high as the heater central potential that would cause the discharge. The most preferable setting is such that the absolute value of the positive power supply voltage is the same as that of the negative power supply voltage. Such differential driving of the heater 124 by use of the positive power supply and the negative power supply can effectively suppress the noise transmitted from the magnetic disk 11 to the heater line pair 442c, 442d. Further, an absolute value difference between the positive power supply potential and the negative power supply potential is reduced to prevent the head element portion 122 from being damaged.

As mentioned above, the characteristic impedance of the heater line pair 442c, 442d is preferably set higher even upon the differential driving of the heater 124 by use of the positive and negative power supplies, whereby the noise transmission from the magnetic disk is more reliably prevented. The characteristic impedance value of the heater line pair 442c, 442d is preferably set in a manner similar to the case where one of the heater lines 442c and 442d is grounded in the preamplifier 42.

As set forth above, the present invention is described by way of the preferred embodiment but is not limited to the above embodiment. For example, the present invention is applicable to an apparatus using a recording disk other than the magnetic disk. From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A recording disk drive, comprising:
    a head slider including a slider flying over a rotating recording disk, a head element portion on the slider, and a heater on the slider for adjusting a clearance between the head element portion and a recording disk;
    an actuator holding the head slider and moving the head slider, and having a preamplifier; and
    a heater line pair connected with the head slider and the preamplifier for supplying a current to the heater and electrically floating the heater from the preamplifier on the actuator to the slider, such that the heater line pair is not electrically grounded between the preamplifier and the slider to reduce noise on the head element.

2. The recording disk drive according to claim 1 wherein one line of the heater line pair has a positive potential and the other line of the heater line pair has a negative potential when the current is supplied to the heater, and wherein one line of the heater line pair is grounded in the preamplifier.

3. The recording disk drive according to claim 2 wherein an absolute value of the positive potential is the same as an absolute value of the negative potential.

4. The recording disk drive according to claim 1 further comprising a circuit having a heater driver electrically connected with the heater line pair for driving the heater wherein one line of the heater line pair is grounded in the circuit in the preamplifier.

5. The recording disk drive according to claim 1 wherein, the head element portion includes a write element and a read element, wherein the recording disk drive further comprises:
    a write line pair connected with the head slider and transmitting a signal of the write element; and
    a read line pair connected with the bead slider and transmitting a signal of the read element, and
    wherein the heater line pair extends laterally between the write line pair and the read line pair.

6. The recording disk drive according to claim 5 wherein a characteristic impedance of the heater line pair is higher than a characteristic impedance of the write line pair.

7. The recording disk drive according to claim 5 further comprising a circuit electrically connected with the heater line pair for driving the heater wherein a line of the heater line pair on the write line pair side is grounded in the preamplifier of the circuit.

8. The recording disk drive according to claim 5 wherein a characteristic impedance of the heater line pair is higher than a characteristic impedance of the write line pair by 20 Ω or more.

9. A recording disk drive, comprising:
    a head slider defining a longitudinal direction and a lateral direction transverse to the longitudinal direction, the head slider including a slider flying over a rotating recording disk, a head element portion provided to the slider and including a read element and a write element, a heater provided to the slider and adjusting a clearance between the head element portion and the recording disk;
    a preamplifier coupled to the slider;
    a read line pair connected with the head slider and a read driver, and transmitting a signal of the read element;
    a write line pair connected with the head slider and a write driver, and transmitting a signal of the write element;
    a heater line pair connected with the head slider, the preamplifier and a heater driver for and supplying a current to the heater, the heater line pair extending laterally between the write line pair and the read line pair, and having a characteristic impedance higher than a characteristic impedance of the write line pair;
    an actuator holding the head slider and moving the head slider, wherein the heater line pair is electrically floating and is not grounded from heating line contacts of the preamplifier to heating line contacts of the slider, and one line of the heater line pair is located laterally on a write line pair side and is grounded in the preamplifier to reduce noise on the head element portion; and wherein
    one line of the heater line pair has a positive potential and the other line of the heater line pair has a negative potential when the current is supplied to the heater, and an absolute value of the positive potential is the same as an absolute value of the negative potential.

* * * * *